United States Patent
Hutton (10) Patent No.: US 7,669,270 B2
(45) Date of Patent: Mar. 2, 2010

(54) SYSTEM AND METHOD FOR WIRELESS COMMUNICATION BETWEEN AN AIRCRAFT AND A PASSENGER BOARDING BRIDGE

(75) Inventor: Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 686 days.

(21) Appl. No.: 11/589,754

(22) Filed: Oct. 31, 2006

(65) Prior Publication Data

US 2008/0098539 A1  May 1, 2008

(51) Int. Cl.
G08B 21/00 (2006.01)
E01D 15/00 (2006.01)

(52) U.S. Cl. ................. 14/71.5; 340/686.2; 340/686.6; 340/958; 250/206.1

(58) Field of Classification Search ................. 14/71.5; 340/686.2, 686.6, 958; 250/206.1
See application file for complete search history.

(56) References Cited

U.S. PATENT DOCUMENTS

| | | | |
|---|---|---|---|
| 3,662,332 A * | 5/1972 | Zechnowitz et al. | 340/958 |
| 3,729,262 A * | 4/1973 | Snead et al. | 356/153 |
| 6,637,063 B1 | 10/2003 | Hutton et al. | |
| 6,742,210 B2 | 6/2004 | Hutton et al. | |
| 6,757,927 B2 | 7/2004 | Hutton et al. | |
| 6,907,635 B2 | 6/2005 | Hutton et al. | |

OTHER PUBLICATIONS

U.S. Appl. No. 11/149,401, Hutton.
U.S. Appl. No. 11/155,502, Hutton.
U.S. Appl. No. 11/157,934, Hutton.
U.S. Appl. No. 11/157,938, Hutton.
U.S. Appl. No. 11/373,976, Hutton.
U.S. Appl. No. 11/519,968, Hutton.

* cited by examiner

Primary Examiner—Raymond W Addie
(74) Attorney, Agent, or Firm—Freedman & Associates (57) ABSTRACT

A method of aligning one end of a passenger boarding bridge with a doorway of an aircraft includes a step of parking the aircraft within a parking space that is defined adjacent to the passenger boarding bridge. An imager disposed aboard the aircraft is used for scanning a target that is located proximate the parking space, the target including machine-readable information that is uniquely associated with the passenger boarding bridge. Data relating to the machine-readable information of the target is extracted from image data and used for encoding a signal for transmission to a controller of the passenger boarding bridge. The controller determines the presence of the extracted data and compares the data to a unique bridge identifier code for that passenger boarding bridge. When a match is determined, then communication with an aircraft within or proximate a parking space adjacent to that passenger boarding bridge is confirmed.

31 Claims, 6 Drawing Sheets

SYSTEM AND METHOD FOR WIRELESS COMMUNICATION BETWEEN AN AIRCRAFT AND A PASSENGER BOARDING BRIDGE

FIELD OF THE INVENTION

The instant invention relates to passenger boarding bridges, and more particularly to a method and system for initiating wireless communication between an aircraft and a controller of a passenger boarding bridge.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal.

A manual bridge alignment system requires that a human operator is present to perform the alignment operation each time an aircraft arrives. Delays occur when the human operator is not standing-by to perform the alignment operation as soon as the aircraft comes to a stop. In addition, human operators are prone to errors that result in the passenger boarding bridge being driven into the aircraft or into a piece of ground service equipment. Such collisions involving the passenger boarding bridge are costly and also result in delays. In order to avoid causing a collision, human operators tend to err on the side of caution and drive the passenger boarding bridge slowly and cautiously.

Semi-automated bridge alignment systems also require a human operator, but the human operator may be present at a remote location and interact with the bridge control system in a tele-robotic manner. One human operator may interact with a plurality of different passenger boarding bridges, thereby reducing the costs associated with training and paying the salaries of human operators. Alternatively, certain movements of the bridge are automated, whilst other movements are performed under the control of the human operator.

Automated bridge alignment systems provide a number of advantages compared to manual and semi-automated systems. For instance, automated bridge alignment systems do not require a human operator, and therefore the costs that are associated with training and paying the salaries of human operators are reduced or eliminated. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft traffic.

Early attempts at automated bridge alignment systems employed imagers and sensors disposed on or about the passenger boarding bridge, for sensing locations of aircraft doorways and for sensing close approach of the bridge to the aircraft. More recently, automated bridge alignment systems have been developed in which beacon docking signals and/or control signals are transmitted wirelessly between an aircraft and a passenger boarding bridge, as described for example in U.S. Pat. Nos. 6,637,063, 6,742,210, 6,757,927 and 6,907,635, the entire contents of all of which are incorporated herein by reference. Other systems relying upon wireless transmission of signals between an aircraft and a passenger boarding bridge during alignment are disclosed in U.S. patent application Ser. Nos. 11/149,401, 11/155,502, 11/157,934 and 11/157,938, the entire contents of all of which are incorporated herein by reference.

Unfortunately, automated bridge alignment systems still are susceptible to errors that result in the passenger boarding bridge being driven into the aircraft. For instance, in a system in which an aircraft wirelessly transmits a call signal for initiating an automated alignment operation of a passenger boarding bridge, it is possible that one or more neighboring passenger boarding bridges may intercept and act upon the call signal as well. In this case, an aircraft may inadvertently initiate automated docking of more than one passenger boarding bridge at time. As a result, the neighboring bridges may collide with aircraft or ground service equipment located adjacent thereto, particularly since the bridge movement is sudden and unexpected. Similarly, control signals and/or confirmation signals that are exchanged between an aircraft and an assigned passenger boarding bridge may be intercepted and acted upon by other passenger boarding bridges in close proximity to the assigned passenger boarding bridge. With the growing number of automated bridge alignment systems that are in use at airports, the problem of cross-talk related bridge incidents is becoming more of a concern.

In U.S. patent application Ser. No. 11/373,976, Hutton teaches the use of unique aircraft identifier codes for encoding signals for transmission between an aircraft and a controller of an automated bridge alignment system. Since no two aircraft have the same unique aircraft identifier code, a message that is encoded with a particular unique aircraft identifier code may be positively identified as originating from a particular aircraft. When it is determined that the message has originated from a particular aircraft that is assigned to the passenger boarding bridge, then the controller of the automated bridge alignment system accepts the message as a valid message to be acted upon during a current bridge alignment operation. Optionally, messages transmitted to the aircraft from the controller are also encoded using the same unique aircraft identifier code. The system and method using unique aircraft identifier codes is useful and supports very secure communication between aircraft and ground based bridge control systems. Accordingly, the system and method addresses the problem of cross-talk related bridge incidents. However, the unique aircraft identifier code for every aircraft that is assigned to a passenger boarding bridge must be provided in advance to the controller of the automated bridge alignment system. Last minute gate assignment changes may result in an aircraft arriving at a passenger boarding bridge "unannounced," such that the controller of the automated bridge alignment system does not recognize messages transmitted therefrom as valid messages to be acted upon during a current bridge alignment operation. In addition, some aircraft may not have a unique aircraft identifier.

SUMMARY OF EMBODIMENTS OF THE INVENTION

In accordance with an aspect of the instant invention there is provided a method of aligning one end of a passenger boarding bridge with a doorway of an aircraft, a parking space being defined adjacent to the passenger boarding bridge within which parking space the aircraft is parked during a current alignment operation, the method comprising: parking the aircraft within the parking space; using an imager disposed aboard the aircraft, scanning a target that is located proximate the parking space, the target including machine-readable information that is uniquely associated with the passenger boarding bridge; extracting data relating to the machine-readable information of the target; and, encoding a signal with the extracted data for transmission to the passenger boarding bridge via a communication module of the aircraft.

In accordance with another aspect of the instant invention there is provided a method of aligning one end of a passenger boarding bridge with a doorway of an aircraft, a parking space being defined adjacent to the passenger boarding bridge within which parking space the aircraft is parked during a current alignment operation, the method comprising: providing a passenger boarding bridge including a bridge alignment control system; associating a unique identifier with the passenger boarding bridge; displaying a target at a location that is proximate the passenger boarding bridge, the target comprising machine-readable information relating to the unique identifier; using a receiver that is in communication with the bridge alignment control system, receiving a wireless signal transmitted from the aircraft; processing the wireless signal to determine a presence of data relating to the unique identifier within the wireless signal; and, accepting the wireless signal as a control signal for a current bridge alignment operation when it is determined that the wireless signal includes the data relating to the unique identifier.

In accordance with another aspect of the instant invention there is provided a system for aligning one end of a passenger boarding bridge with a doorway of an aircraft, a parking space being defined adjacent to the passenger boarding bridge within which parking space the aircraft is parked during a current alignment operation, the system comprising: a target disposed at a location that is proximate the passenger boarding bridge and comprising machine-readable information that is indicative of a unique identifier associated with the passenger boarding bridge; an imager disposed aboard the aircraft for scanning the target during a period of time in which the aircraft is parked within the parking space; a first processor disposed aboard the aircraft for extracting data relating to the unique identifier from the scanned image; a transmitter disposed aboard the aircraft and in communication with the first processor, the transmitter for wirelessly transmitting a signal encoded with the extracted data; a receiver disposed at a location that is remote from the aircraft for receiving the signal encoded with the extracted data; and, a second processor in communication with the receiver for processing the received signal and for identifying the extracted data contained within the received signal.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
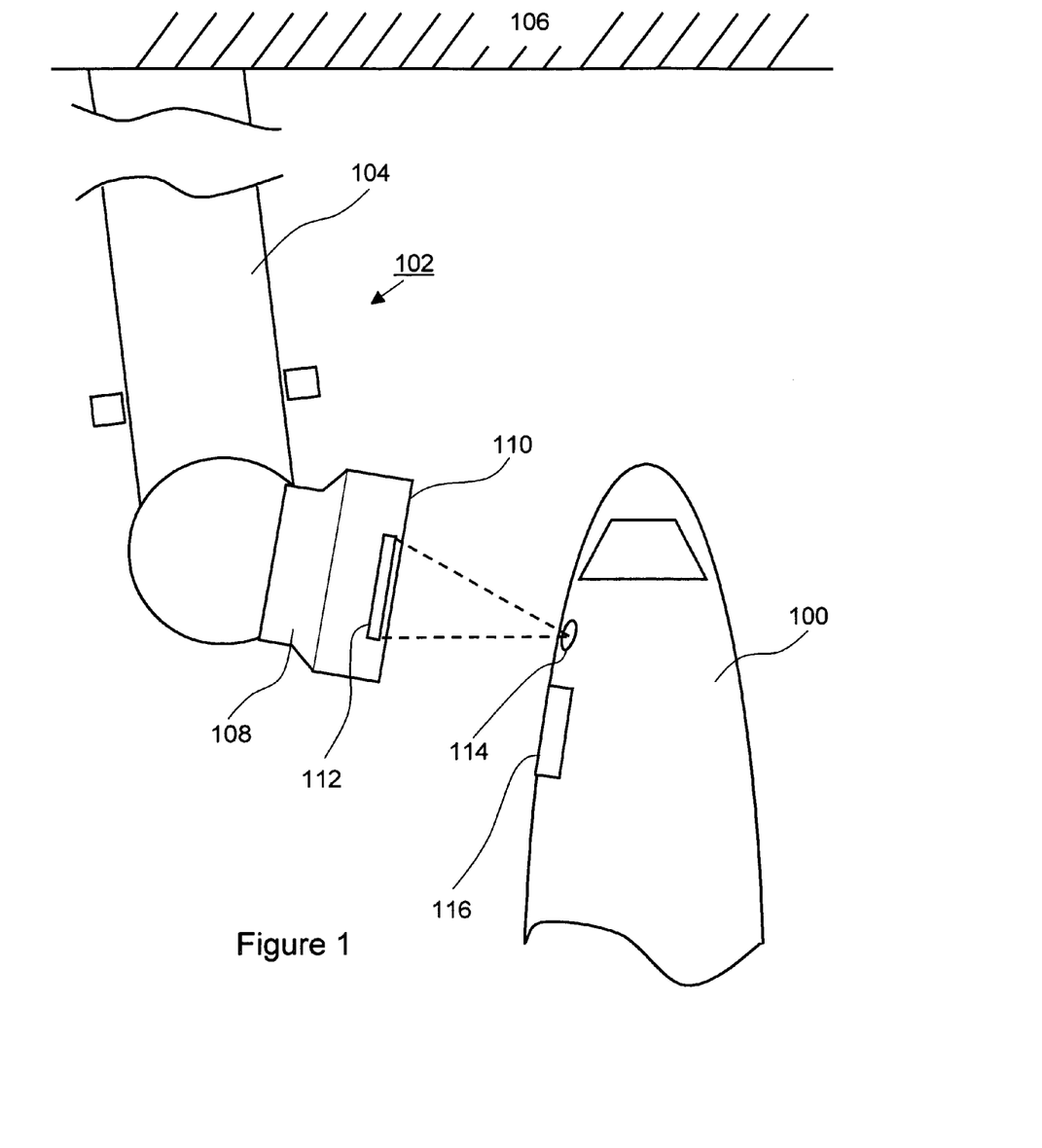
FIG. 1 is a simplified top view showing an aircraft that is imaging a target mounted to a passenger boarding bridge.

Referring to FIG. 1, shown is a simplified top view of an aircraft that is imaging a target mounted to a passenger boarding bridge. The aircraft 100 is within or proximate a parking space that is defined adjacent to the passenger boarding bridge 102. The passenger boarding bridge 102 includes a passageway 104 extending between a terminal building 106 and a pivotal cabin 108. The pivotal cabin 108 is open at an aircraft-engaging end 110 thereof. A target 112 including machine-readable information, which is uniquely associated with the passenger boarding bridge 102, is mounted adjacent to an upper surface of the pivotal cabin 108 and near the aircraft-engaging end 110. The target 112 displays an OCR (optical character readable) scannable image, such as for instance a bar-code type image. The target 112 is mounted so as to be visible to an imager 114 that is disposed aboard the aircraft 100, when the aircraft 100 is within or proximate the parking space. The target 112 is also mounted so as to be substantially obscured from view when the aircraft 100 is not proximate the parking space. Optionally, a not illustrated shroud is provided around the target 112 so as to restrict the area from which the target 112 is viewable. Optionally, a film or a screen is disposed in front of the target 112 so as to prevent imaging of the target 112 from a location that is outside of a predetermined imaging area. Restricting the area from which the target 112 is viewable reduces the likelihood of the target 112 being imaged accidentally by an aircraft that is approaching another passenger boarding bridge. In other words, there is a high confidence level that only an aircraft that is within or proximate the parking space immediately adjacent to passenger boarding bridge 102 will image the target 112.

Referring still to FIG. 1, the imager 114 is shown along a lateral surface of the aircraft 100 that faces toward passenger boarding bridge 102. Conventionally, a passenger boarding bridge is aligned with a doorway along the left side of an aircraft. FIG. 1 shows one specific and non-limiting example for the placement of imager 114 aboard the aircraft 100. Optionally, the imager is placed at another location aboard the aircraft 100, such as for instance rearward of doorway 116, within a window of the aircraft, within the cockpit area of the aircraft, or even along the right lateral surface of the aircraft. The actual placement of the imager 114 is important only in so far as there is a direct line-of-sight between the imager 114 and the target 112 when the aircraft 100 enters the parking space adjacent the passenger boarding bridge 102. Accordingly, the imager 114 is placed along the right lateral surface of the aircraft only if the target 112 will always be viewable by the imager when the aircraft is within a parking space adjacent to a passenger boarding bridge. Placement of imager 114 along the right lateral surface of the aircraft may necessitate mounting the target on a support that is remote from the passenger boarding bridge, such as for instance along an outer surface of terminal building 106.

By way of a specific and non-limiting example, the target 112 includes machine-readable information in the form of a bar code that is at least similar to the type used in the Universal Product Code system. The machine-readable information is unique to the specific passenger boarding bridge that carries the target 112. For instance, the machine-readable information comprises a unique bridge identifier for encoding signals for transmission between the aircraft and the passenger boarding bridge. By way of a non-limiting example, the bar code contains a portion for identifying the specific airport, a portion for identifying the specific terminal of the airport and a portion for identifying the specific passenger boarding bridge. In addition, the bar code contains a check digit portion for verifying accurate scanning of the bar code image. Optionally, the bar code merely contains a portion for distinguishing the specific passenger boarding bridge from other nearby passenger boarding bridges at an airport, as well as a check digit portion for verifying accurate scanning of the bar code image. One of skill in the art will appreciate that uniquely identifying passenger boarding bridges is optionally accomplished using a bar code that is smaller than the 12 digit UPC code, such as for instance an 8 digit zero-suppressed number.

In the instant example the imager 114 is provided in the form of a bar code scanner. The imager 114 scans the target and obtains the machine-readable information that is unique to the passenger boarding bridge 102, e.g. the unique bridge identifier. The information is provided to a not illustrated communications module of the aircraft and is used to encode a signal for transmission to the passenger boarding bridge 102. For instance, the signal is one of a call signal for initiating an automated bridge alignment operation and a command signal for initiating a movement of the passenger boarding bridge. The encoded signal is received at a location that is remote from the aircraft using a not illustrated receiver, such as for instance a receiver disposed aboard the passenger boarding bridge and near the aircraft-engaging end 110. Before a received signal is accepted as a valid signal, a not illustrated communications module in communication with the receiver determines whether the signal is encoded using the unique bridge identifier. If the signal is encoded using the unique bridge identifier then the signal is accepted as a valid signal, but if the signal is not encoded using the unique bridge identifier then the signal is not accepted as a valid signal. When the signal that is accepted comprises a call signal or a command signal, then automated alignment is initiated or the bridge performs an action as specified by the command, respectively. When the signal is not accepted, then optionally an error signal is returned to the aircraft, a request to have the target rescanned is sent to the aircraft, or a page is sent requesting a human bridge operator to perform manual alignment of the passenger boarding bridge 102. Optionally, the encoded signal is transmitted as one of a radio frequency signal and an optical signal. Optionally, encoding a signal includes obfuscating the signal and further optionally encoding a signal includes encrypting the signal using the unique bridge identifier as an encryption key.

Optionally, the machine-readable information is not displayed within target 112 in the form of a bar code. For instance, the machine-readable information is displayed as a series of geometric shapes or using other recognizable symbols or even using alphanumeric characters. Of course, the imager 114 aboard aircraft 100 is provided in a form that is suitable for imaging the target and for recognizing and extracting the machine-readable information that is unique to passenger boarding bridge 102. Some non-limiting examples of other suitable imagers include a digital still camera and a video camera. Optionally, the imager 114 includes a not illustrated light source for illuminating the target 112 during conditions of poor lighting. Optionally, the target 112 is illuminated and/or reflective.

Optionally, a plurality of different unique bridge identifiers is associated with each passenger boarding bridge 102. In this case the target 112 includes a plurality of information display portions, each one containing a different unique bridge identifier for being selectably displayed during different bridge alignment operations. For instance, the target 112 contains bar code information on both sides thereof, and flips over to selectably display different bar code information during different bridge alignment operations. Associating a plurality of unique bridge identifiers with each passenger boarding bridge reduces the chances of an aircraft using a previously scanned identifier during a later bridge alignment operation. Optionally, the imager 114 continues to scan the target during a bridge alignment operation and the unique bridge identifier is changed periodically as the bridge alignment operation progresses. This helps to ensure that the passenger boarding bridge 102 and the aircraft are communicating in real time, and that other aircraft are not cross talking with the passenger boarding bridge 102. Optionally, the number of unique bridge identifiers per passenger boarding bridge is greater than two.

Figure 2A:
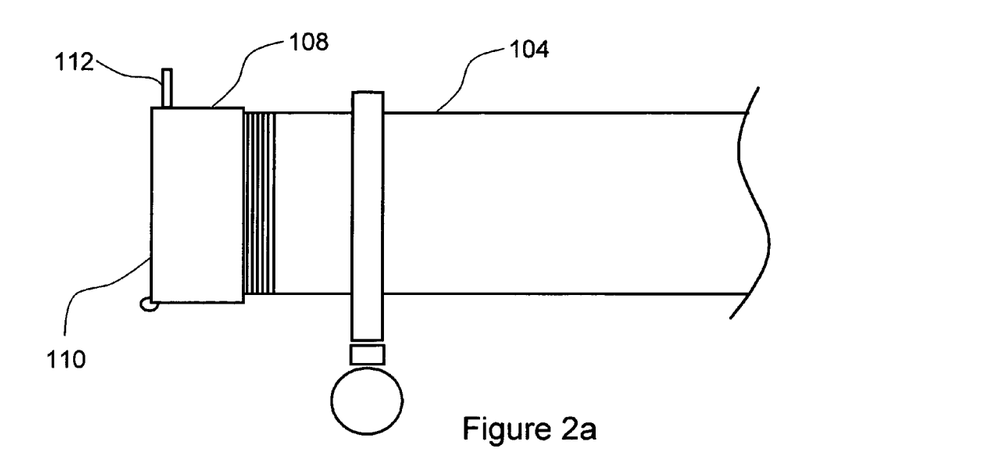
FIG. 2a is a simplified side view showing an aircraft-engaging end of a passenger boarding bridge, including a machine readable target that is mounted adjacent a top surface of a pivotal cabin.

Referring now to FIG. 2a, shown is a simplified side view of an aircraft-engaging end of a passenger boarding bridge, including a machine-readable target that is mounted adjacent a top surface of a pivotal cabin. An extensible canopy, which is normally provided at the aircraft-engaging end 110 of pivotal cabin 108, is omitted in FIG. 2a. The extensible canopy typically is fabricated from a sturdy and flexible material, and is carried on a frame for providing a substantially weather-tight seal between the exterior of the aircraft and the aircraft-engaging end 110 of pivotal cabin 108. Accordingly, placement of the target 112 adjacent the top surface of pivotal cabin 108 is subject to the design of such an extensible canopy, when present.

Figure 2B:
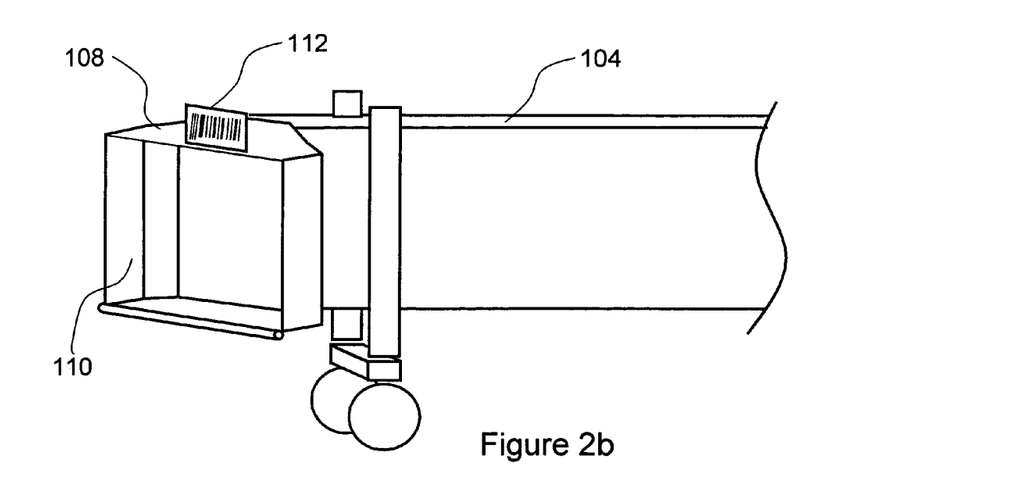
FIG. 2b is a simplified side-elevational view showing an aircraft-engaging end of a passenger boarding bridge, including a machine readable target that is mounted adjacent a top surface of a pivotal cabin.

Referring now to FIG. 2b, shown is a simplified side-elevational view of an aircraft-engaging end of a passenger boarding bridge, including a machine readable target that is mounted adjacent a top surface of a pivotal cabin. FIG. 2b is representative of the orientation of the pivotal cabin 108 relative to passageway 104 prior to aircraft 102 entering the parking space adjacent to passenger boarding bridge 102. In particular, the aircraft-engaging end 110 faces generally toward the direction of aircraft approach to the parking space. Accordingly, the target 112 is presented for being scanned by imager 114 as the aircraft approaches the parking space.

Figure 3A:
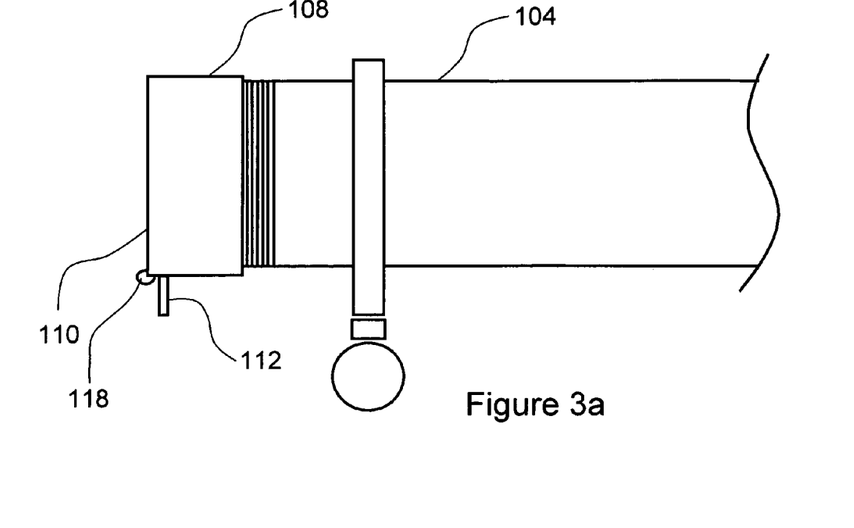
FIG. 3a is a simplified side view showing an aircraft-engaging end of a passenger boarding bridge, including a machine readable target that is mounted adjacent a lower surface of a pivotal cabin.

Referring now to FIG. 3a, shown is a simplified side view of an aircraft-engaging end of a passenger boarding bridge, including a machine readable target that is mounted adjacent a lower surface of a pivotal cabin. A bumper element 118, which is normally provided adjacent the floor surface of the aircraft-engaging end 110 of pivotal cabin 108, is shown in FIG. 3a. Accordingly, placement of the target 112 adjacent the lower surface of pivotal cabin 108 is subject to the design of such a bumper element 118, when present.

Figure 3B:
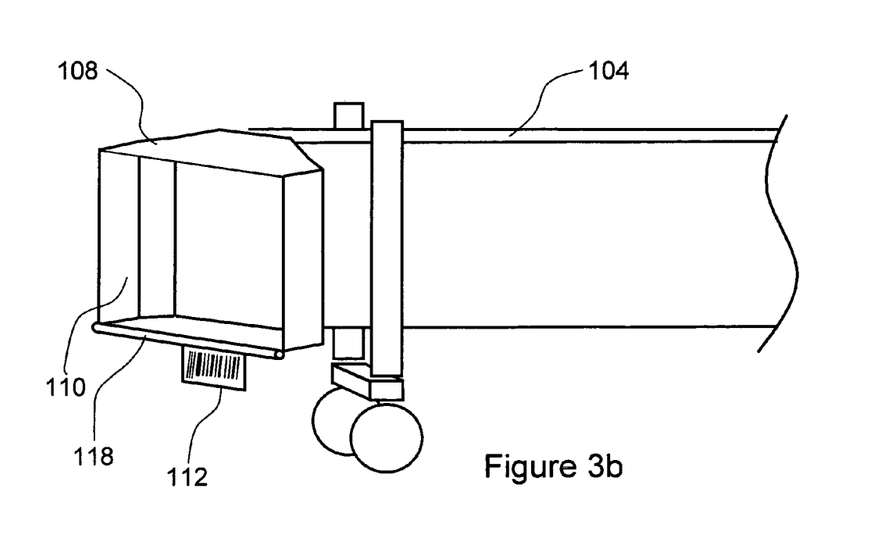
FIG. 3b is a simplified side-elevational view showing an aircraft-engaging end of a passenger boarding bridge, including a machine readable target that is mounted adjacent a lower surface of a pivotal cabin.

Referring now to FIG. 3b, shown is a simplified side-elevational view of an aircraft-engaging end of a passenger boarding bridge, including a machine readable target that is mounted adjacent a lower surface of a pivotal cabin. FIG. 3b is representative of the orientation of the pivotal cabin 108 relative to passageway 104 prior to aircraft 102 entering the parking space adjacent to passenger boarding bridge 102. In particular, the aircraft-engaging end 110 faces generally toward the direction of aircraft approach to the parking space. Accordingly, the target 112 is presented for being scanned by imager 114 as the aircraft approaches the parking space.

Figure 4:
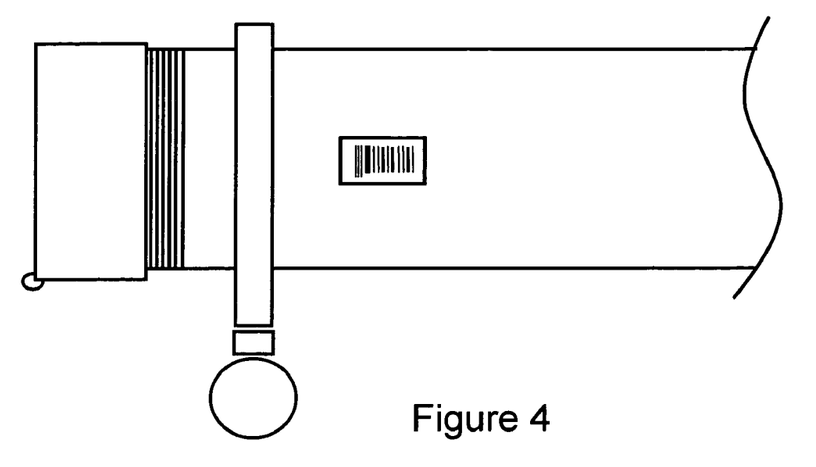
FIG. 4 is a simplified side view showing an aircraft-engaging end of a passenger boarding bridge, including a machine readable target that is mounted adjacent a lateral surface of a passageway of the passenger boarding bridge.

Referring now to FIG. 4, shown is a simplified side view of an aircraft-engaging end of a passenger boarding bridge, including a machine readable target that is mounted adjacent a lateral surface of a passageway of the passenger boarding bridge. FIG. 4 is one non-limiting example of an alternate placement of target 112. Other alternate placements include an exterior surface of terminal building 106, on a mounting structure extending from a surface of the passenger boarding bridge 102, or on a stand or post secured to the apron surface and adjacent to the parking space. The actual placement of the target 112 is important only in so far as there is a direct line-of-sight between the imager 114 and the target 112 when the aircraft 100 enters the parking space adjacent the passenger boarding bridge 102.

Figure 5:
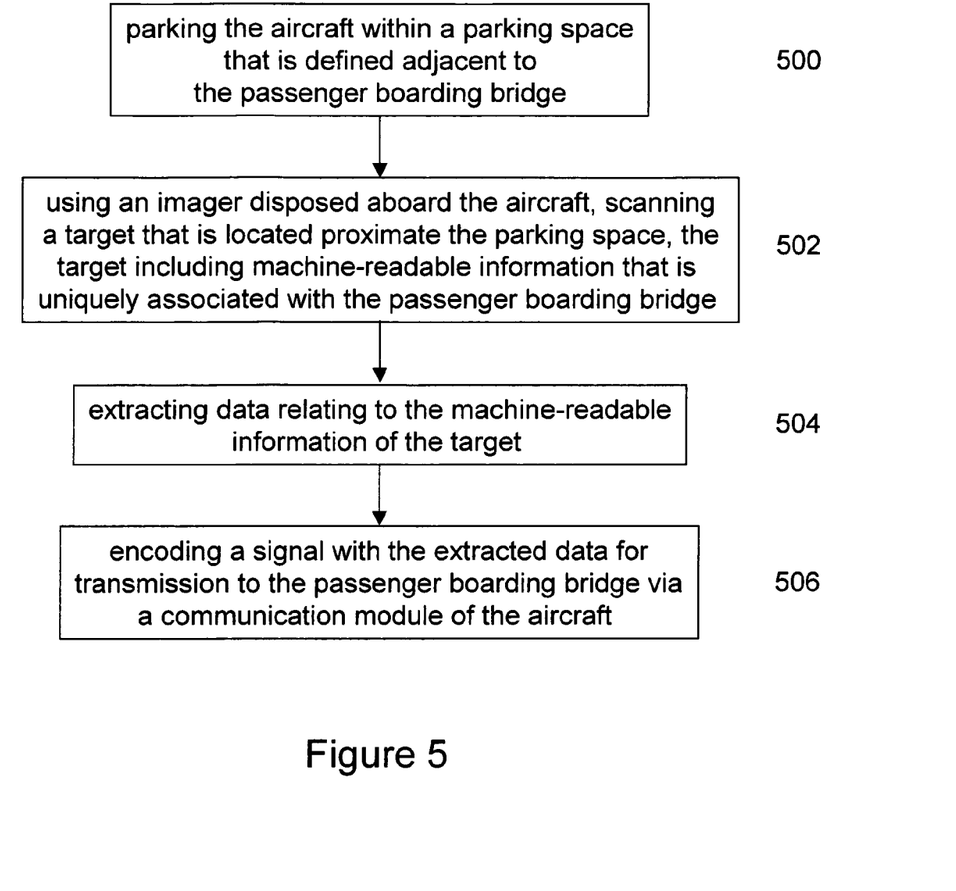
FIG. 5 is a simplified flow diagram of a method for aligning one end of a passenger boarding bridge with a doorway of an aircraft, according to an embodiment of the instant invention; and, FIG. 6 is a simplified flow diagram of a method for aligning one end of a passenger boarding bridge with a doorway of an aircraft, according to an embodiment of the instant invention.

Referring now to FIG. 5, shown is a simplified flow diagram of a method for aligning one end of a passenger boarding bridge with a doorway of an aircraft, according to an embodiment of the instant invention. At step 500 the aircraft is parked within a parking space adjacent to the passenger boarding bridge. At step 502 an imager disposed aboard the aircraft is used to scan a target that is located proximate the parking space, the target including machine-readable information that is uniquely associated with the passenger boarding bridge. At step 504 data relating to the machine-readable information of the target is extracted. At step 506 a signal is encoded with the extracted data for transmission to the passenger boarding bridge via a communication module of the aircraft.

Figure 6:
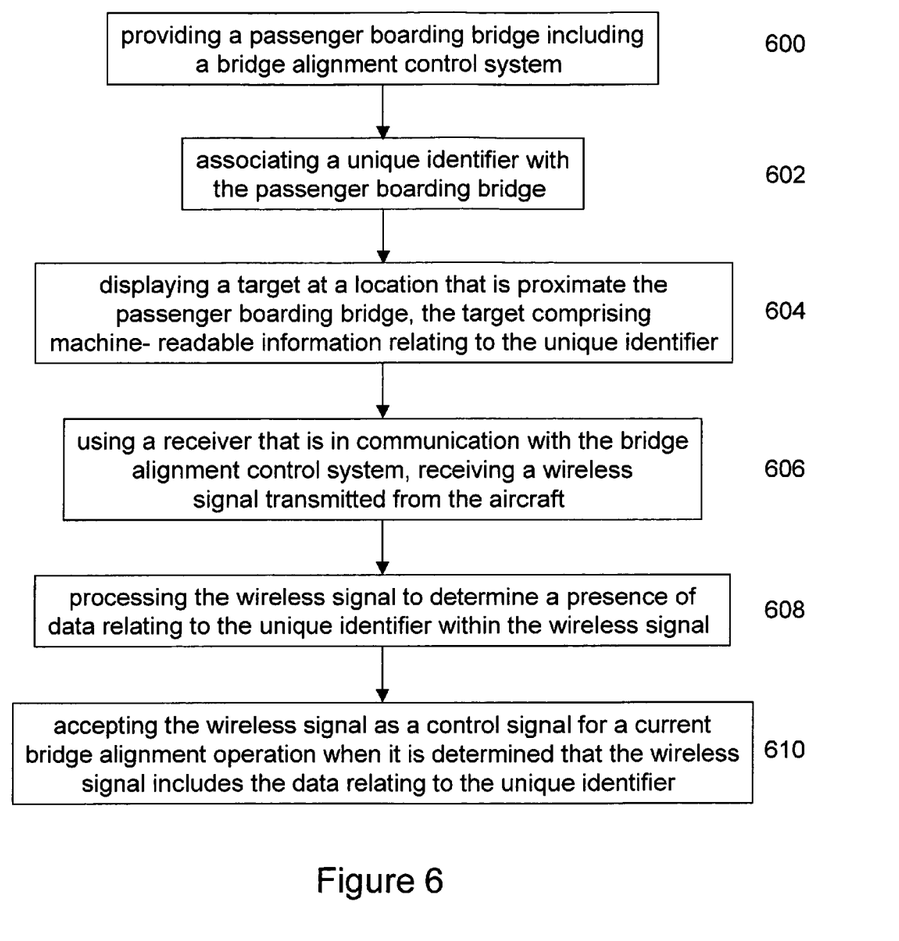

Referring now to FIG. 6, shown is a simplified flow diagram of a method for aligning one end of a passenger boarding bridge with a doorway of an aircraft, according to an embodiment of the instant invention. At step 600 a passenger boarding bridge is provided, the passenger boarding bridge including a bridge alignment control system. At step 602 a unique identifier is associated with the passenger boarding bridge. At step 604 a target is displayed at a location that is proximate the passenger boarding bridge, the target comprising machine-readable information relating to the unique identifier. At step 606 a wireless signal transmitted from the aircraft is received using a receiver that is in communication with the bridge alignment control system. At step 608 the wireless signal is processed to determine a presence of data relating to the unique identifier within the wireless signal. At step 610 the wireless signal is accepted as a control signal for a current bridge alignment operation when it is determined that the wireless signal includes the data relating to the unique identifier.

Of course, when two-way communication occurs between a controller of the passenger boarding bridge 102 and the aircraft 100, then optionally the same unique bridge identifier is used for encoding signals transmitted in both directions. Signals are transmitted through free space between the aircraft 100 and the controller of the passenger boarding bridge 102, for instance as one of an optical signal and a radio frequency signal.

Numerous other embodiments may be envisaged without departing from the spirit and scope of the invention.

What is claimed is:

1. A method of initiating wireless communication between an aircraft and a controller of a passenger boarding bridge, a parking space being defined adjacent to the passenger boarding bridge within which parking space the aircraft is parked during a current alignment operation, the method comprising:
    parking the aircraft within the parking space;
    using an imager disposed aboard the aircraft, scanning a target that is located proximate the parking space, the target including machine-readable bar code information that is uniquely associated with the passenger boarding bridge;
    extracting data relating to the machine-readable bar code information of the target;
    encoding a signal with the extracted data for transmission to the passenger boarding bridge via a communication module of the aircraft; and,
    transmitting the encoded signal from the communication module of the aircraft to a receiver that is in communication with the passenger boarding bridge,
    wherein the encoded signal is accepted as a valid signal for the current alignment operation when it is determined that the encoded signal is encoded using the extracted data.

2. A method according to claim 1, wherein the extracted data is indicative of a unique identifier that is associated with the passenger boarding bridge.

3. A method according to claim 1, wherein encoding a signal comprises encrypting the signal using the extracted data as a cryptographic key, the encrypted signal for being transmitted to the passenger boarding bridge during a current bridge alignment operation.

4. A method according to claim 1, wherein extracting data is performed using a processor disposed aboard the aircraft, the processor in communication with both of the imager and the communication module.

5. A method according to claim 4, wherein encoding a signal is performed using the processor disposed aboard the aircraft.

6. A method according to claim 1, wherein encoding a signal comprises providing control signal data relating to a current bridge alignment operation and attaching the extracted data to the control signal data.

7. A method according to claim 6, wherein the control signal data comprises a call signal for initiating an automated bridge alignment operation.

8. A method according to claim 6, wherein the control signal data comprises an instruction for initiating a movement of the passenger boarding bridge during a current bridge alignment operation.

9. A method according to claim 6, wherein the control signal data comprises a beacon signal for providing an indication of a location of the doorway to which the one end of the passenger boarding bridge is to be aligned.

10. A method according to claim 1, wherein encoding a signal comprises providing control signal data relating to a current bridge alignment operation and encrypting the control signal data using the extracted data as a cryptographic key.

11. A method according to claim 10, wherein the control signal data comprises a call signal for initiating an automated bridge alignment operation.

12. A method according to claim 10, wherein the control signal data comprises an instruction for initiating a movement of the passenger boarding bridge during a current bridge alignment operation.

13. A method according to claim 10, wherein the control signal data comprises a beacon signal for providing an indication of a location of the doorway to which the one end of the passenger boarding bridge is to be aligned.

14. A method according to claim 1, wherein encoding a signal is performed for verifying that the one end of the passenger boarding bridge is being aligned with a doorway of an aircraft that is parked within the parking space adjacent to that passenger boarding bridge.

15. A method of initiating wireless communication between an aircraft and a controller of a passenger boarding bridge, a parking space being defined adjacent to the passenger boarding bridge within which parking space the aircraft is parked during a current alignment operation, the method comprising:
    providing a passenger boarding bridge including a bridge alignment control system;
    associating a unique identifier with the passenger boarding bridge;
    displaying a target at a location that is proximate the passenger boarding bridge, the target comprising machine-readable bar code information relating to the unique identifier;
    using a receiver that is in communication with the bridge alignment control system, receiving a wireless signal transmitted from the aircraft;
    processing the wireless signal to determine a presence of data relating to the unique identifier within the wireless signal; and,
    accepting the wireless signal as a control signal for a current bridge alignment operation when it is determined that the wireless signal includes the data relating to the unique identifier.

16. A method according to claim 15, wherein displaying the target comprises displaying the target such that the target is substantially obscured when viewed from a location outside the aircraft parking space.

17. A method according to claim 15, wherein processing the wireless signal comprises decrypting the wireless signal using the unique identifier as a cryptographic key.

18. A method according to claim 15, wherein the control signal comprises a call signal transmitted from the aircraft for initiating an automated bridge alignment operation.

19. A method according to claim 15, wherein the control signal comprises an instruction signal transmitted from the aircraft for initiating a movement of the passenger boarding bridge during a current bridge alignment operation.

20. A method according to claim 15, wherein the control signal comprises a beacon signal transmitted from the aircraft for providing an indication of a location of the doorway to which the one end of the passenger boarding bridge is to be aligned.

21. A method according to claim 15, wherein the bridge alignment control system is an automated bridge alignment control system for aligning the one end of the passenger boarding bridge with the doorway of the aircraft in an automated manner.

22. A method according to claim 15, comprising using a sensor that is in communication with the bridge alignment control system, sensing an indication of the aircraft being within the parking space, wherein the sensor is disposed at a location that is remote from the aircraft.

23. A system for initiating wireless communication between an aircraft and a controller of a passenger boarding bridge, a parking space being defined adjacent to the passenger boarding bridge within which parking space the aircraft is parked during a current alignment operation, the system comprising:
    a target disposed at a location that is proximate the passenger boarding bridge and comprising machine-readable bar code information that is indicative of a unique identifier associated with the passenger boarding bridge;
    an imager disposed aboard the aircraft for scanning the target during a period of time in which the aircraft is parked within the parking space;
    a first processor disposed aboard the aircraft for extracting data relating to the unique identifier from the scanned image;
    a transmitter disposed aboard the aircraft and in communication with the first processor, the transmitter for wirelessly transmitting a signal encoded with the extracted data;
    a receiver disposed at a location that is remote from the aircraft for receiving the signal encoded with the extracted data; and,
    a second processor in communication with the receiver for processing the received signal and for identifying the extracted data contained within the received signal.

24. A system according to claim 23, wherein the imager comprises a bar code scanner.

25. A system according to claim 23, wherein the target is mounted adjacent a surface of the passenger boarding bridge.

26. A system according to claim 23, wherein the passenger boarding bridge comprises a pivotal cabin disposed at an outboard end thereof, and wherein the target is mounted adjacent a top surface of the pivotal cabin.

27. A system according to claim 23, wherein the passenger boarding bridge comprises a pivotal cabin disposed at an outboard end thereof, and wherein the target is mounted adjacent a lower surface of the pivotal cabin.

28. A system according to claim 23, wherein the passenger boarding bridge comprises a passageway section having an inboard end and an outboard end, and wherein the target is mounted adjacent a surface of the passageway section.

29. A system according to claim 23, wherein the target includes a plurality of information display portions, each information display portion containing a different unique bridge identifier for being displayed in a selectable fashion.

30. A system according to claim 23, comprising a shroud disposed around a portion of the target for preventing imaging of the target from outside of a predetermined imaging area within or proximate the parking space.

31. A system according to claim 23, comprising one of a film and a screen disposed in front of the target for preventing imaging of the target from outside of a predetermined imaging area within or proximate the parking space.

* * * * *